: 3,138,455
PROCESS FOR THE PRODUCTION OF LOW SILICON, MEDIUM-TO-LOW CARBON FERROMANGANESE
Michael C. Carosella, Niagara Falls, and William Chynoweth, Williamsville, N.Y., assignors to Union Carbide Corporation, a corporation of New York
Filed Apr. 2, 1962, Ser. No. 184,015
5 Claims. (Cl. 75—133.5)

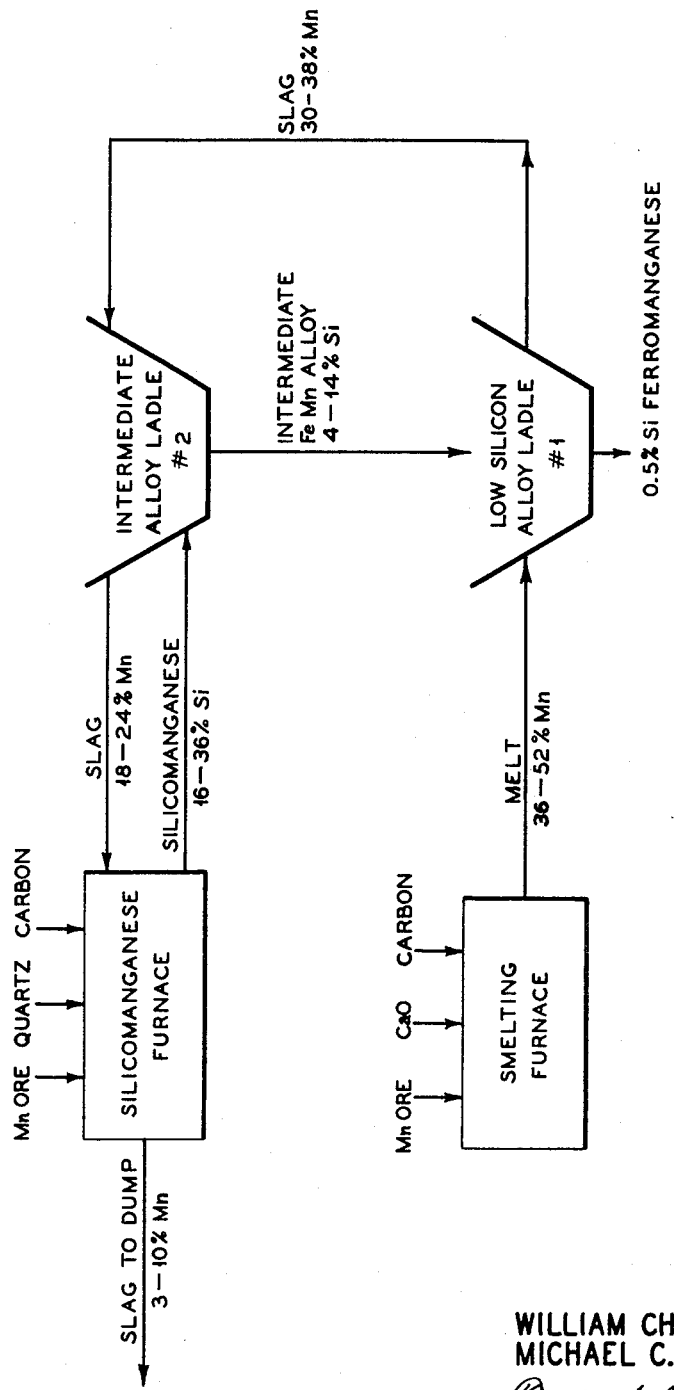

The present invention relates to the production of ferromanganese. More particularly, the present invention relates to a cyclic process for producing low silicon, medium-to-low carbon ferromanganese.

At present, medium-to-low carbon ferromanganese is produced in a two-step fusion and reduction process in which manganese ore is initially fused in an electric furnace with lime and sufficient carbon to eliminate that part of the oxygen in the ore which would be released if all the manganese oxide in the ore were reduced to MnO. The ore-lime fusion product thus obtained is tapped into a ladle and reacted with sufficient silicon-reducing agent to yield a low silicon, medium-to-low carbon ferromanganese and a slag containing about 30 percent manganese. In manufacturing a low-silicon ferromanganese of not more than about 2.0 percent silicon by the aforedescribed process, the silicon-reducing agent required, usually a mixture of commercial grade silicomanganese and silicon, has a total silicon content of about 22 percent.

One of the drawbacks associated with this technique is that the rate of ferromanganese production is considerably limited owing to the relatively low proportion of manganese in the reducing agent. Also, due to the relatively large proportion of silicon in the reducing agent, the temperature of the exothermic reducing reaction is difficult to control and consequently excessive refractory consumption and inefficient process operation often result. Further, composition control of the final alloy, particularly with respect to silicon content, is very difficult, especially when the aim is for the lower silicon levels.

Consequently, while the aforedescribed process provides certain advantages, it would be of considerable industrial benefit if the production of low silicon, medium-to-low carbon ferromanganese could be accomplished with substantially improved rate of production, compositional control and manganese recovery.

It is therefore an object of the present invention to provide a process for manufacturing low silicon, medium-to-low carbon ferromanganese at an increased rate of production.

It is another object of the present invention to provide a process for manufacturing low silicon, medium-to-low carbon ferromanganese in which process compositional control can be readily achieved even at very low silicon levels.

It is a further object of the present invention to provide a process for manufacturing low silicon, medium-to-low carbon ferromanganese in which process operating temperatures and other variables can be more easily controlled.

It is a still further object of the present invention to provide a process for manufacturing low silicon, medium-to-low carbon ferromanganese in which a very high recovery of manganese is obtained.

It is another object of the present invention to provide a process for manufacturing low silicon, medium-to-low carbon ferromanganese, which process has improved overall economy.

Other objects will be apparent from the following description and claims taken in conjunction with the drawing in which the figure of the drawing shows a schematic flow diagram of an embodiment of the process of the present invention.

A process in accordance with the present invention for producing low silicon, medium-to-low carbon ferromanganese comprises preparing a melt of oxidic manganese material without substantial reduction of the manganese values to elemental manganese and in which the amount of oxygen combined with manganese is no greater than about that represented by the formula $Mn_2O_3$; transferring the melt to a first ladle; adding to the melt in the first ladle sufficient of a silicon reducing agent containing between about 4 and about 14 percent silicon to reduce the manganese values in the melt and produce a low silicon, medium-to-low carbon ferromanganese alloy and a manganese-containing slag; reacting the manganese-containing slag with a silicon-reducing agent in a second ladle to produce an intermediate ferromanganese alloy containing between about 4 and about 14 percent silicon; and cyclically repeating the foregoing process steps employing the intermediate 4 to 14 percent silicon alloy produced in the second ladle as the reducing agent in the first ladle.

In the practice of the present invention, the aforementioned manganese ore containing melt can be prepared in any convenient manner. For example, certain commercially available manganese bearing materials such as ores which have been calcined to nodules can often be fused with lime in the absence of carbon to provide a suitable oxygen depleted melt. With other materials such as raw manganese ores, carbon may be admixed with ore and lime to provide the required oxygen level in the melt. Regardless of the manner in which the low oxygen content of the melt is obtained, the overall economy of the present process is substantially improved since substantially less silicon reducing agent and lime is ultimately required in the process. Further increased benefits are achieved in a preferred embodiment of the present invention wherein the melt is treated so that substantially all of the manganese contained therein is in the manganous state.

The process of the present invention is particularly advantageous in the production of low silicon, medium-to-low carbon ferromanganese having a composition in the range of 80 to 90 percent manganese, 0.04 to 1.5 percent carbon, 0.1 to 1 percent silicon, balance iron.

The present invention will be more clearly understood by referring to the flow diagram illustrated in the figure of the drawing which illustrates a particular embodiment of the present invention. With reference to the flow diagram, manganese ore, carbon and lime are heated to fusion in a smelting furnace which may for example be a tilting submerged arc electric furnace. The carbon admixed with the ore can be in any suitable form, including coal or the lower grades of coke, and is present in the mixture in an amount sufficient to reduce substantially all of the manganese values to the divalent state, but not to the elemental state. That is, the formation of substantial amounts of elemental manganese in the smelting furnace is avoided. When the furnace charge has been melted and the manganese values reduced to the manganous state, the fusion product, which contains about 36 to 52 percent manganese, is poured into a first ladle, indicated in the flow diagram as the low silicon alloy ladle. The ore fusion product is reacted in this first ladle with a silicon-reducing agent containing between about 4 and about 14 percent silicon to produce a low silicon, medium-to-low carbon ferromanganese and a manganese-containing slag which contains between about 30 and 38 percent manganese. The slag, while still molten, is decanted into a second ladle, indicated as the intermediate alloy ladle, and reacted therein with a silicon-reducing agent such as silicomanganese to produce an intermediate ferromanganese alloy containing about 4 to about 14 percent silicon and a slag containing about 18 to 24 percent manganese. The intermediate alloy thus produced is then poured into the first ladle as the silicon-reducing agent and is reacted therein with manganese-containing melt from the smelting furnace to produce the desired low silicon, medium-to-low carbon ferromanganese alloy product.

It can be seen from the flow diagram and the foregoing description that the process of the present invention is a cyclical process wherein the high manganese content slag resulting from the production of the desired low silicon, medium-to-low carbon ferromanganese in the first ladle is processed in a second ladle to provide an intermediate silicon alloy which is then recycled to the first ladle for use as the reducing agent.

Additionally, as shown in the flow diagram, the second slag which is derived in the formation of the intermediate alloy in the second ladle, and which contains between 18 and 24 percent manganese, can also be processed with additional manganese ore, quartz and carbon to produce a 16 to 36 percent Si silicomanganese for use in the production of the intermediate alloy.

The overall manganese recovery from the aforedescribed process is very high, being between 90 and 97 percent. The rate of production of low silicon, medium-to-low carbon ferromanganese in the present invention is also quite high due to the large proportion of manganese in the re-cycled intermediate alloy reducing agent.

Also, since the silicon content of the re-cycled intermediate alloy reducing agent is low, the exothermicity of the reducing reaction is not excessive and consequently process operation can be readily controlled. For the same reason, heat damage to the process apparatus is sharply reduced.

In the practice of the present invention, control of process operating temperatures can be further improved by adding part of the intermediate alloy reducing agent into the first ladle in solid crushed form to provide a heat sink. Also, crushed standard ferromanganese can be added with the intermediate alloy for the same purpose without adversely affecting the process.

Although most often the required amount of silicon to produce the desired final alloy can be provided by way of the intermediate alloy, if the intermediate alloy happens to contain less silicon than is required, the balance necessary can be added in the form of molten silicomanganese.

With regard to the carbon content of the final alloy, which depends on the carbon content of the 4 to 14 percent silicon intermediate alloy, this factor can be closely governed to provide the desired medium-to-low carbon product by controlling the carbon content of the reducing agent used in the second ladle in producing the intermediate alloy.

In addition to the benefits previously mentioned, a particular advantage of the process of the present invention is its flexibility. For example, portions of the intermediate alloy of the process can be readily withdrawn for sale if a demand develops.

Further, product composition and process operation can be conveniently regulated since reactants and moderating materials can be added without difficulty at the various stages of the process. For example, when necessary, standard ferromanganese and/or silicomanganese can be added with intermediate alloy in the first ladle to provide temperature and compositional control. Also, both solid and molten silicomanganese can be added in the second ladle for similar purposes.

The following examples are provided to further illustrate the present invention.

EXAMPLE I

A mixture of manganese ore, lime and coal is melted in a submerged arc electric furnace to provide a melt in which substantially all of the contained manganese is in the manganous state. The melt contains 44.81 percent manganese. The composition of the furnace mixture from which the melt is prepared is shown in Table I.

*Table I.—Furnace Mixture*

| Material: | Proportion, parts by weight |
|---|---|
| Mn ore (approx. 50% Mn) | 75 |
| Standard burnt lime | 19 |
| Metallurgical coal | 6 |
| | 100.00 |

The melt from the furnace is poured into a first ladle and reacted therein with a silicon reducing agent to provide a low silicon, medium-to-low carbon ferromanganese alloy and a slag containing about 36 percent manganese. A major portion of the slag from the first ladle is decanted into a second ladle. Molten silicomanganese (18.5% Si, 65.5% Mn, 1.5% C, balance Fe) and solid crushed ferromanganese silicon (30 Si, 65 Mn, 0.05 C, balance Fe) are reacted with the slag in the second ladle. The proportions by weight of slag, molten silicomanganese and crushed ferromanganese silicon are 69:19:12.

The reaction in the second ladle provides a slag containing about 22 percent manganese and an intermediate alloy having a composition of 9.47% Si, 81.3% Mn, 0.74% C, balance Fe.

This intermediate alloy is poured into the first ladle and reacted therein with a melt prepared as aforedescribed from the ore, lime, carbon mixture of Table I. The ratio of melt to intermediate alloy in the first ladle is 2:1.

The alloy product of the reaction in the first ladle is withdrawn and has a composition of 0.18% Si, 0.62% C, 85.65% Mn, balance Fe.

The above steps are repeated cyclically using the intermediate alloy produced in the second ladle as the silicon-reducing agent in the first ladle. Also, the slag derived in the production of the intermediate alloy is reacted with carbon and quartz in a furnace to produce silicomanganese.

The overall recovery of manganese in the above process is 97 percent.

EXAMPLE II

A mixture of manganese ore, lime and coal is melted in a submerged arc electric furnace to provide a melt in which substantially all of the contained manganese is in the manganous state. The melt contains 44.81 percent manganese. The composition of the furnace mixture from which the melt is prepared is shown in Table II.

*Table II.—Furnace Mixture*

| Material: | Proportion, parts by weight |
|---|---|
| Mn ore (approx. 50% Mn) | 75 |
| Standard burnt lime | 19 |
| Metallurgical coal | 6 |
| | 100.00 |

The melt from the furnace is poured into a first ladle and reacted therein with a silicon reducing agent to provide a low silicon, medium-to-low carbon ferromanganese alloy and a slag containing about 36 percent manganese. A major portion of the slag from the first ladle is decanted into a second ladle. Molten silicomanganese (18.5% Si, 65.5% Mn, 1.5% C, balance Fe) is reacted with the slag in the second ladle. The proportions by weight of slag and molten silicomanganese are 4:1.

The reaction in the second ladle provides a slag containing about 22 percent manganese and an intermediate alloy having a composition of 8.61% Si, 77.97% Mn, 1.24% C, balance Fe.

This intermediate alloy is poured into the first ladle together with solid, crushed standard ferromanganese (75% Mn, 0.5% Si, 6.8% C, balance Fe). These materials are reacted in the first ladle with a melt prepared as aforedescribed from the ore, lime, carbon mixture of Table II. The ratio of melt, intermediate alloy and standard ferromanganese in the first ladle is 61:37:2.

The alloy product of the reaction in the first ladle is withdrawn and has a composition of 0.30% Si, 1.33% C, 82.41% Mn, balance Fe.

The above steps are repeated cyclically using the intermediate alloy produced in the second ladle as the silicon-reducing agent in the first ladle. Also, the slag derived in the production of the intermediate alloy is reacted with carbon and quartz in a furnace to produce silicomanganese (18.5% Si, 1.5% C, 65.5% Mn, balance Fe) which is re-cycled to the second ladle as the reducing agent.

The overall recovery of manganese in the above process is 96.7 percent.

EXAMPLE III

A mixture of manganese ore and lime is melted in a submerged arc electric furnace to provide a melt in which the oxygen combined with manganese is less than the amount represented by the formula $Mn_2O_3$. The melt contains 40 percent manganese. The composition of the furnace mixture from which the melt is prepared is shown in Table III.

*Table III.—Furnace Mixture*

| Material: | Proportion, parts by weight |
|---|---|
| Mn ore (approx. 50% Mn) | 74 |
| Standard burnt lime | 26 |
| | 100.00 |

The melt from the furnace is poured into a first ladle and reacted therein with a silicon reducing agent to provide a low silicon, medium-to-low carbon ferromanganese alloy and a slag containing about 39 percent manganese. A major portion of the slag from the first ladle is decanted into a second ladle. Molten silicomanganese (18.5% Si, 65.5% Mn, 1.5% C, balance Fe) is reacted with the slag in the second ladle. The proportions by weight of slag and molten silicomanganese are 64:36.

The reaction in the second ladle provides a slag containing about 22 percent manganese and an intermediate alloy having a composition of 9.1% Si, 77.0% Mn, balance Fe.

This intermediate alloy is poured into the first ladle and reacted therein with a melt prepared as aforedescribed from the ore and lime mixture of Table III. The ratio of melt to intermediate alloy in the first ladle is 1.5:1.

The alloy product of the reaction in the first ladle is withdrawn and has a composition of 0.3% Si, 81.0% Mn, balance Fe and impurities including the carbon introduced by the molten silicomanganese.

The above steps are repeated cyclically using the intermediate alloy produced in the second ladle as the silicon-reducing agent in the first ladle. Also, the slag derived in the production of the intermediate alloy is reacted with carbon and quartz in a furnace to produce silicomanganese.

The overall recovery of manganese in the above process is 97 percent.

From the above description it can be seen that the present invention represents a substantial benefit to the art by providing a process for producing low silicon, medium-to-low carbon ferromanganese with increased rate of production, efficiency and overall economy.

What is claimed is:

1. A process for the production of medium-to-low carbon ferromanganese which comprises preparing a melt of oxidic manganese-containing material without substantial reduction of the manganese values to elemental manganese and in which the amount of oxygen combined with manganese is no greater than about that represented by the formula $Mn_2O_3$; transferring the melt to a first ladle; adding to said melt in said first ladle sufficient of a silicon reducing agent containing between about 4 and about 14 percent silicon to reduce the manganese values and produce a medium-to-low carbon ferromanganese alloy and a manganese-containing slag; reacting said manganese-containing slag with silicon-reducing agent in a second ladle to produce an intermediate ferromanganese alloy containing between about 4 and about 14 percent silicon; and cyclically repeating the foregoing process steps employing said intermediate alloy as the reducing agent in the first ladle.

2. A process for the production of medium-to-low carbon ferromanganese which comprises smelting manganese ore with at least sufficient carbonaceous reducing agent to provide a melt containing substantially all of the manganese values in the manganous state without substantial reduction of the manganese values to elemental manganese; transferring the melt to a first ladle; adding to said melt in said first ladle sufficient of a silicon reducing agent containing between about 4 and about 14 percent silicon to reduce the manganese values and produce a medium-to-low carbon ferromanganese alloy and a manganese-containing slag; reacting said manganese-containing slag with silicon-reducing agent in a second ladle to produce an intermediate ferromanganese alloy containing between about 4 and about 14 percent silicon; and cyclically repeating the foregoing process steps employing said intermediate alloy as the reducing agent in the first ladle.

3. A process for the production of medium-to-low carbon ferromanganese which comprises smelting manganese ore with at least sufficient carbonaceous reducing agent to provide a melt containing substantially all of the manganese values in the manganous state without substantial reduction of the manganese values to elemental manganese, said melt containing between about 40 and 52 percent manganese; transferring the melt to a first ladle; adding to said melt in said first ladle sufficient of a silicon reducing agent containing between about 4 and about 14 percent silicon to reduce the manganese values and produce a medium-to-low carbon ferromanganese alloy containing less than about 1.0 percent silicon and a slag containing between about 30 and about 36 percent manganese; reacting said manganese-containing slag with silicon-reducing agent in a second ladle to produce an intermediate ferromanganese alloy containing between about 4 and about 14 percent silicon; and cyclically repeating the foregoing process steps employing said intermediate alloy as the reducing agent in the first ladle.

4. A process for the production of medium-to-low carbon ferromanganese which comprises smelting manganese ore with at least sufficient carbonaceous reducing agent to provide a melt containing substantially all of the manganese values in the manganous state without substantial reduction of the manganese values to elemental manganese; transferring the melt to a first ladle; adding to said melt sufficient of a silicon reducing agent containing between about 4 and about 14 percent silicon to reduce the manganese values and produce a medium-to-low carbon ferromanganese alloy and a manganese-containing slag; reacting said manganese-containing slag with silicomanganese in a second ladle to produce an intermediate ferromanganese alloy containing between about 4 and 14 percent silicon and a second manganese-containing slag; reacting said second manganese-containing slag with additional manganese ore, carbon and silica to produce silicomanganese; and cyclically repeating the foregoing process steps employing said intermediate alloy as the reducing agent in the first ladle and employing said produced silicomanganese in the second ladle in the production of said intermediate alloy.

5. A process for the production of medium-to-low carbon ferromanganese which comprises smelting manganese ore with at least sufficient carbonaceous reducing agent to provide a melt containing substantially all of the manganese values in the manganous state without substantial reduction of the manganese values to elemental manganese, said melt containing between about 42 and 52 percent manganese; transferring the melt to a first ladle; adding to said melt sufficient of a silicon reducing agent containing between about 4 and about 14 percent silicon to reduce the manganese values and produce a medium-to-low carbon ferromanganese alloy containing less than about 1.0 percent silicon and a slag containing between about 30 and about 36 percent manganese; reacting said manganese-containing slag with silicomanganese in a second ladle to produce an intermediate ferromanganese alloy containing between about 4 and about 14 percent silicon and a second slag containing between about 20 and 25 percent manganese; reacting said second manganese-containing slag with additional manganese ore, carbon and silica to produce silicomanganese; and cyclically repeating the foregoing process steps employing said intermediate alloy as the reducing agent in the first ladle and employing said produced silicomanganese in the second ladle in the production of said intermediate alloy.

References Cited in the file of this patent

UNITED STATES PATENTS

| | | |
|---|---|---|
| 2,775,518 | Udy | Dec. 25, 1956 |
| 3,074,793 | Kuhlmann | Jan. 22, 1963 |
| 3,083,092 | Kuhlmann | Mar. 26, 1963 |

FOREIGN PATENTS

| | | |
|---|---|---|
| 36,842 | Norway | Feb. 19, 1923 |